US011397818B2

(12) United States Patent
Balu et al.

(10) Patent No.: US 11,397,818 B2
(45) Date of Patent: Jul. 26, 2022

(54) METHOD, APPARATUS AND COMPUTER PROGRAM PRODUCT FOR DETERMINING A SEMANTIC PRIVACY INDEX

(71) Applicant: HERE GLOBAL B.V., Eindhoven (NL)

(72) Inventors: Raghavendran Balu, Eindhoven (NL); Stefano Bennati, Zürich (CH); Aleksandra Kovacevic, Wettswil (CH); Arash Ostadzadeh, Nuenen (NL); Kai Pöthkow, Berlin (DE); Elena Mumford, Eindhoven (NL); Elena Vidyakina, Berlin (DE); Zack Zhu, Baar (CH)

(73) Assignee: HERE GLOBAL B.V., Eindhoven (NL)

( * ) Notice: Subject to any disclaimer, the term of this patent is extended or adjusted under 35 U.S.C. 154(b) by 403 days.

(21) Appl. No.: 16/714,159

(22) Filed: Dec. 13, 2019

(65) Prior Publication Data

US 2021/0182402 A1 Jun. 17, 2021

(51) Int. Cl.
G06F 21/62 (2013.01)
G06F 21/57 (2013.01)
(Continued)

(52) U.S. Cl.
CPC ........ *G06F 21/577* (2013.01); *G06F 21/6254* (2013.01); *G06F 40/30* (2020.01);
(Continued)

(58) Field of Classification Search
CPC .............. G06F 21/577; G06F 21/6254; G06F 21/6245; G06F 21/60; G06F 40/30;
(Continued)

(56) References Cited

U.S. PATENT DOCUMENTS 9,547,845 B2   1/2017 Agrawal et al.
2010/0077006 A1*  3/2010 El Emam .............. G06F 16/284
                                              707/E17.032
(Continued)

FOREIGN PATENT DOCUMENTS

CN        105120431 A      12/2015

OTHER PUBLICATIONS

Gkoulalas-Divanis, A. et al., *Identifying Unsafe Routes for Network-Based Trajectory Privacy*, SIAM International Conference on Data Mining (2009).
(Continued)

*Primary Examiner* — Brian F Shaw
(74) *Attorney, Agent, or Firm* — Alston & Bird LLP

(57) ABSTRACT

A method, apparatus and computer program product are provided to determine a semantic privacy index that quantifies the risk associated with re-identification of a trajectory following anonymization of the trajectory. In the context of a method, information regarding a trajectory is received. After the trajectory has been map matched to a portion of a road network, the method associates contextual information comprising one or more map features with the trajectory. The method also provides the information regarding the trajectory and the contextual information comprising the one or more map features to a risk estimation model in order to generate the semantic privacy index.

20 Claims, 2 Drawing Sheets

(51) Int. Cl.
  *G06N 20/00* (2019.01)
  *G06F 40/30* (2020.01)
  *G06N 7/00* (2006.01)
(52) U.S. Cl.
  CPC .............. *G06N 7/005* (2013.01); *G06N 20/00* (2019.01); *G06F 2221/032* (2013.01)
(58) Field of Classification Search
  CPC ............... G06F 16/2365; G06F 16/215; G06F 2221/032; G06N 7/005; G06N 20/00; G01C 21/00
  See application file for complete search history.

(56) References Cited

U.S. PATENT DOCUMENTS

2013/0261954 A1  10/2013  Boschker et al.
2017/0083708 A1  3/2017  Braghin et al.
2018/0004978 A1  1/2018  Hebert et al.

OTHER PUBLICATIONS

Monreale, A. et al., *C-Safety: A Framework for the Anonymization of Semantic Trajectories*, Transactions on Data Privacy 4 (2011) 73-101.
Pellungrini, R. et al., *A Data Mining Approach to Access Privacy Risk in Human Mobility Data*, ACM Transactions on Intelligent systems and Technology, vol. 9, No. 3, Article 31 (2107) 13:1-31:27.
Quercia, D. et al., *Aesthetic Capital: What Makes London Look Beautiful, Quiet and Happy?*, CSCW'14 (Feb. 2014) 11 pages.
Ruiz-Correa, S. et al., *SenseCityVity: Mobile Crowdsourcing, Urban Awareness and Collective Action in Mexico*, IEEE Pervasive Computing, Special Issue on Smart Cities, vol. 16, No. 2, (Apr.-Jun. 2017) 44-53.
Santani, D. et al., *InnerView: Learning Place Ambiance From Social Media Images*, Proc. ACM Int. Conf. on Multimedia (MM) (Oct. 2016) 5 pages.
Extended European Search Report for European Application No. 20213364.1 dated May 25, 2021, 10 pages.

* cited by examiner

METHOD, APPARATUS AND COMPUTER PROGRAM PRODUCT FOR DETERMINING A SEMANTIC PRIVACY INDEX

TECHNOLOGICAL FIELD

An example embodiment relates generally to the determination of a semantic privacy index and, more particularly, to the determination of a semantic privacy index that quantifies the risk of re-identifying a trajectory following anonymization of the trajectory.

BACKGROUND

A sequence of probe points provided by a probe device, such as a mobile device, e.g., a smartphone, a tablet computer, a personal digital assistant (PDA), a personal navigation device (PND), or the like, an in-vehicle navigation system, a vehicle control system, an advanced driver assistance system (ADAS) or the like, as the probe device traverses a route defines a trajectory. The trajectory is associated with the probe device and, in turn, with the user of the probe device and serves to define at least a portion of the route taken by the user. Trajectories may be utilized in conjunction with the provision of a variety of location-based services, such as the provision of real-time traffic information, fleet management and the recommendation of points of interest in the proximity of the user.

The trajectories utilized by the location-based services oftentimes constitute private information and, in some instances, provides significant insight into the habits and behaviours of a user. In an effort to maintain privacy on behalf of the user in a trajectory and in the location and other data conveyed by a trajectory, the trajectory and associated location data may be anonymized such that the user associated with a trajectory is no longer readily identifiable. By anonymizing the trajectory and the location data associated therewith, the risk of a privacy breach is reduced and the risk of the user associated with the trajectory being re-identified is also reduced. However, the anonymization of the trajectory and the location data associated therewith reduces the utility of the trajectory and the related location data which, in turn, reduces the utility of location-based services that are based upon the trajectory and the associated location data. Thus, while a trajectory and associated location data may still be utilized in conjunction with location-based services following their anonymization, the location-based services that are provided may be more limited following anonymizations than those available prior to anonymization.

BRIEF SUMMARY

A method, apparatus and computer program product are provided in accordance with an example embodiment in order to determine a semantic privacy index that quantifies the risk associated with re-identification of a trajectory following anonymization of the trajectory, such as in terms of the sensitivity associated with re-identification of the person or vehicle whose movements defined the trajectory. Information regarding the trajectory may then be anonymized in a manner dependent upon the semantic privacy index. Thus, the method, apparatus and computer program product of an example embodiment balance the risk associated with re-identification of the trajectory and the resulting utility provided by information regarding the trajectory, such as in conjunction with the provision of location-based services. For example, in the instance in which the risk associated with the re-identification of the trajectory following anonymization of the trajectory is relatively low, such as in instances in which the sensitivity associated with re-identification of the person or vehicle whose movements defined the trajectory is low, the method, apparatus and computer program product of an example embodiment may be configured to subject the information regarding the trajectory to a limited form of anonymization such that the information regarding the trajectory retains substantial utility, such as for the provision of location-based services, following the limited anonymization. In contrast, in an instance in which the risk associated with the re-identification of the trajectory following anonymization of the trajectory is significant, such as in instances in which the sensitivity associated with re-identification of the person or vehicle whose movements defined the trajectory is high, the method, apparatus and computer program product of an example embodiment are configured to impose a much greater degree of anonymization upon the trajectory, thereby further limiting the utility of the information regarding the trajectory, such as in conjunction with the provision of location-based services, while increasing the likelihood that the trajectory will not be re-identified following the anonymization.

In an example embodiment, a method is provided for determining a semantic privacy index. The method includes receiving information regarding a trajectory. After the trajectory has been map matched to a portion of a road network, the method associates contextual information comprising one or more map features with the trajectory. The method also provides the information regarding the trajectory and the contextual information comprising the one or more map features to a risk estimation model in order to generate the semantic privacy index. The semantic privacy index quantifies a risk associated with re-identification of the trajectory following anonymization of the trajectory.

The contextual information of an example embodiment includes information having a spatial relationship to the trajectory, such as information regarding one or more points of interest (POIs) located along the trajectory and/or geotagged text or image data. The contextual information of an example embodiment may also or alternatively include information having a temporal relationship to the trajectory and/or information that defines a relationship between two or more points of the trajectory. The method of an example embodiment also includes causing the information regarding the trajectory to be anonymized in a manner dependent upon the semantic privacy index. In an example embodiment, the method also includes training the risk estimation model based upon indications for the map features as to the risk associated with re-identification of the trajectory occasioned by the map features following anonymization of the trajectory.

In another example embodiment, an apparatus is provided that is configured to determine a semantic privacy index. The apparatus includes at least one processor and at least one non-transitory memory including computer program code instructions with the computer program code instructions being configured to, when executed by the at least one processor, cause the apparatus to receive information regarding a trajectory. After the trajectory has been map matched to a portion of a road network, the computer program code instructions are configured to associate contextual information including one or more map features with the trajectory. The computer program code instructions are further configured to provide the information regarding the trajectory and the contextual information comprising the one or more map features to a risk estimation model in order to generate the semantic privacy index. The semantic privacy index quantifies a risk associated with re-identification of the trajectory following anonymization of the trajectory.

The contextual information may include information having a spatial relationship with the trajectory, such as information regarding one or more points of interest (POIs) located along the trajectory and/or geo-tagged text or image data. Additionally or alternatively, the contextual information may include information having a temporal relationship to the trajectory and/or the contextual information may define a relationship between two or more points of the trajectory. The computer program code instructions of an example embodiment are further configured to, when executed by the at least one processor, cause the apparatus to cause the information regarding the trajectory to be anonymized in a manner dependent upon the semantic privacy index. In an example embodiment, the computer program code instructions are further configured to, when executed by the at least one processor, cause the apparatus to train the risk estimation model based upon indications for the map features as to the risk associated with re-identification of the trajectory occasioned by the map features following anonymization of the trajectory.

In a further example embodiment, a computer program product is provided that is configured to determine a semantic privacy index. The computer program product includes at least one non-transitory computer readable storage medium having computer-executable program code instructions stored therein with the computer-executable program code instructions being configured to receive information regarding a trajectory. After the trajectory has been map matched to a portion of a road network, the computer-executable program code instructions are also configured to associate contextual information including one or more map features with the trajectory. The computer-executable program code instructions are further configured to provide the information regarding the trajectory and the contextual information comprising the one or more map features to a risk estimation model in order to generate the semantic privacy index. The semantic privacy index quantifies a risk associated with re-identification of the trajectory following anonymization of the trajectory.

The contextual information of an example embodiment includes information having a spatial relationship to the trajectory, such as information regarding one or more points of interest (POIs) located along the trajectory and/or geo-tagged text or image data. Additionally or alternatively, the contextual information may include information having a temporal relationship to the trajectory and/or the contextual information may define a relationship between two or more points of the trajectory. The computer-executable program code instructions of an example embodiment are further configured to cause the information regarding the trajectory to be anonymized in a manner dependent upon the semantic privacy index. In an example embodiment, the computer-executable program code instructions are further configured to train the risk estimation model based upon indications for the map features as to the risk associated with re-identification of the trajectory occasioned by the map features following anonymization of the trajectory.

In yet another example embodiment, an apparatus is provided that is configured to determine a semantic privacy index. The apparatus includes means for receiving information regarding a trajectory. After the trajectory has been map matched to a portion of a road network, the apparatus also includes means for associating contextual information including one or more map features with the trajectory. The apparatus further includes means for providing the information regarding the trajectory and the contextual information comprising the one or more map features to a risk estimation model in order to generate the semantic privacy index. The semantic privacy index quantifies a risk associated with re-identification of the trajectory following anonymization of the trajectory.

The contextual information of an example embodiment includes information having a spatial relationship to the trajectory, such as information regarding one or more points of interest (POIs) located along the trajectory and/or geo-tagged text or image data. Additionally or alternatively, the contextual information may include information having a temporal relationship to the trajectory and/or the contextual information may define a relationship between two or more points of the trajectory. The apparatus of an example embodiment also includes means for causing the information regarding the trajectory to be anonymized in a manner dependent upon the semantic privacy index. In an example embodiment, the apparatus further includes means for training the risk estimation model based upon indications for the map features as to the risk associated with re-identification of the trajectory occasioned by the map features following anonymization of the trajectory.

BRIEF DESCRIPTION OF THE DRAWINGS

Figure 1:
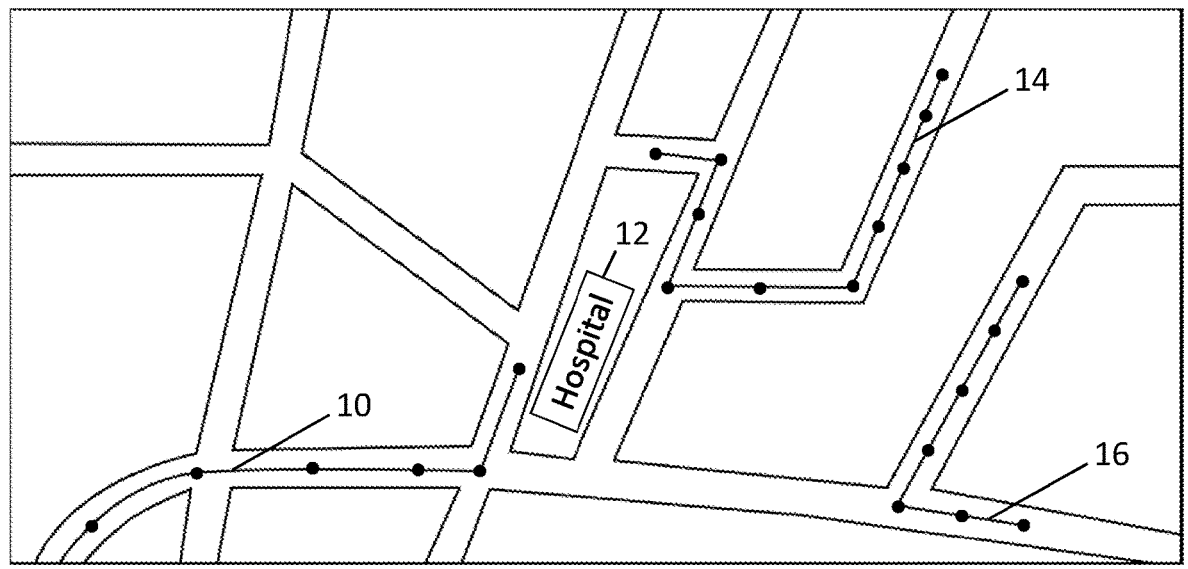
Figure 2:
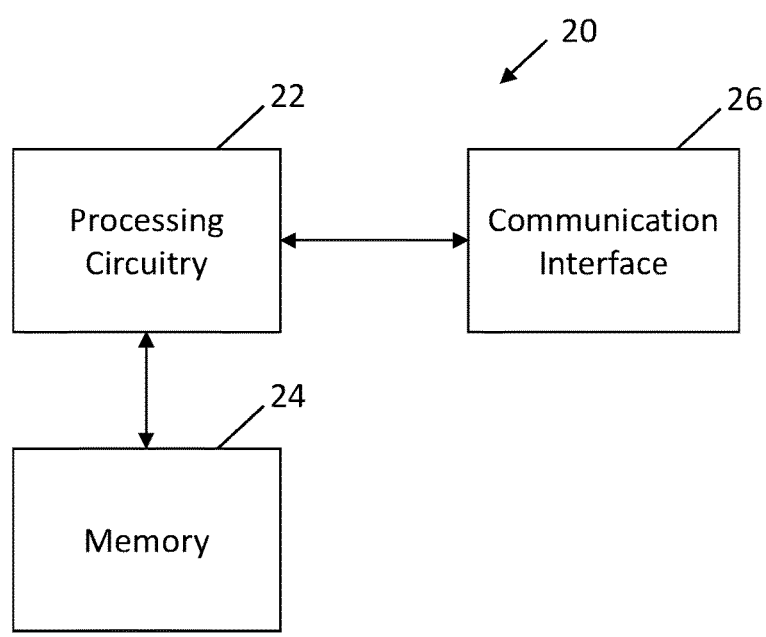
Figure 3:
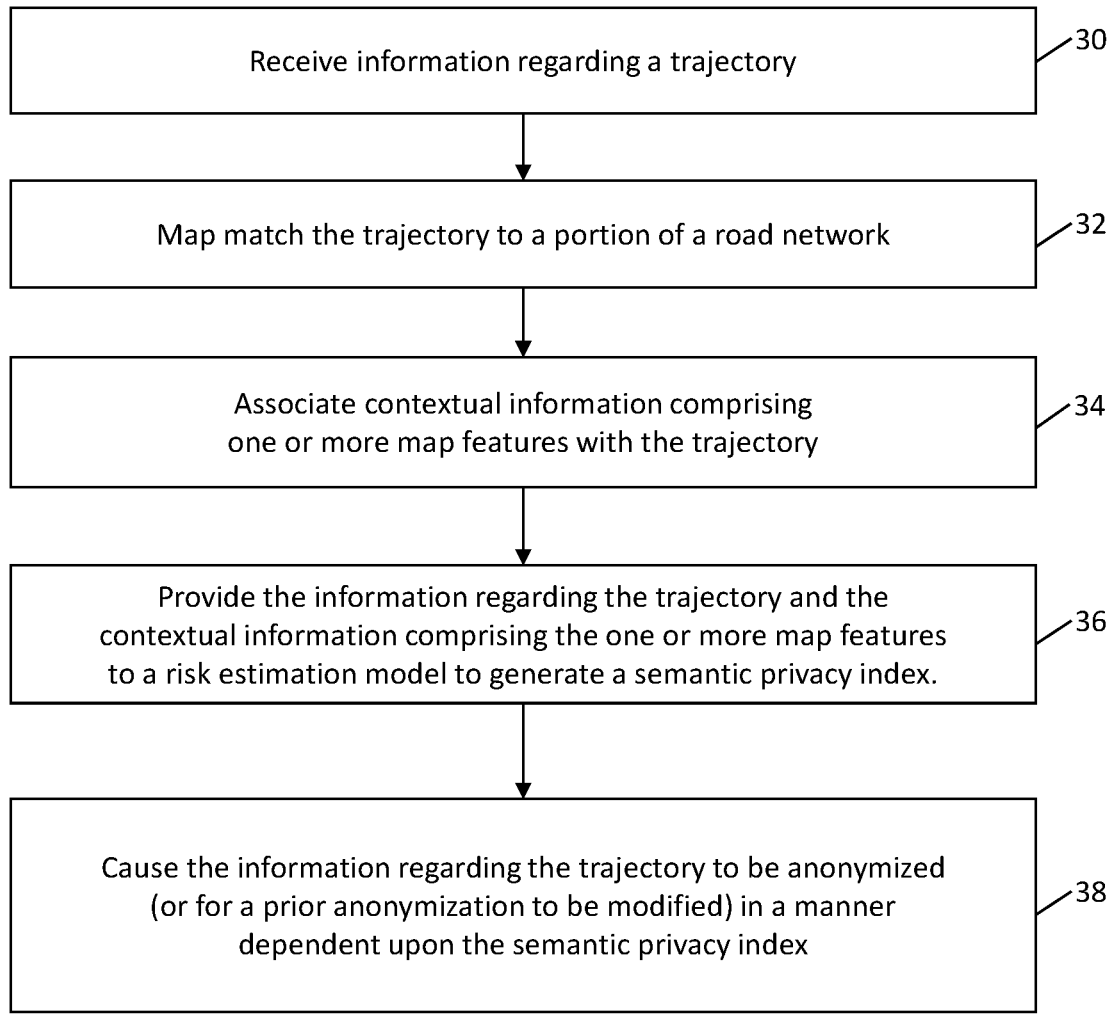

Having thus described certain embodiments of the invention in general terms, reference will now be made to the accompanying drawings, which are not necessarily drawn to scale, and wherein:

FIG. 1 is a map of a portion of a road network which illustrates a plurality of trajectories, each comprised of a plurality of probe points, as well as several points of interest (POIs);

FIG. 2 is a block diagram of an apparatus configured to determine a semantic privacy index in accordance with an example embodiment of the present disclosure; and FIG. 3 is a flow chart illustrating the operations performed, such as by the apparatus of FIG. 2, in order to determine a semantic privacy index in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to determine a semantic privacy index. The semantic privacy index is associated with a trajectory or a portion of a trajectory and serves to quantify the risk associated with re-identification of the trajectory following anonymization of the trajectory, such as in terms of the sensitivity associated with re-identification of the person or vehicle whose movements defined the trajectory. Based upon the risk associated with re-identification of the trajectory, information regarding the trajectory may be correspondingly anonymized, such as by being anonymized to an extent or in a manner that is proportional to the risk associated with re-identification of the trajectory. For example, in the instance in which the risk associated with re-identification of the trajectory following anonymization of the trajectory is relatively low, such as in an instance in which there is a relatively low sensitivity associated with re-identification of the person or vehicle whose movements defined the trajectory, the method, apparatus and computer program product of an example embodiment may be configured to subject the information regarding the trajectory to a limited form of anonymization such that the information regarding the trajectory retains substantial utility, such as for the provision of location-based services, following the limited anonymization. In contrast, in an instance in which the risk associated with re-identification of the trajectory following anonymization of the trajectory is significant, such as in an instance in which there is a relatively high sensitivity associated with re-identification of the person or vehicle whose movements defined the trajectory, the method, apparatus and computer program product of an example embodiment are configured to impose a much greater degree of anonymization upon the trajectory, thereby constraining the utility of the information regarding the trajectory, such as in conjunction with the provision of location-based services, but increasing the likelihood that the trajectory and, in turn, the person or vehicle whose movements defined the trajectory will not be re-identified following the anonymization.

A trajectory is generally formed of a plurality of probe points provided by a probe device indicating at least a portion of a route traversed by the probe device. Probe points may be provided by a variety of probe devices, such as a mobile device, e.g., a smartphone, a tablet computer, a PDA, a PND, or the like, an in-vehicle navigation system, a vehicle control system, an ADAS or the like, that provide probe data regarding, for example, the location of a vehicle that carries the probe device as the vehicle proceeds along a road. In this regard, probe data associated with a probe point may include not only the location of the vehicle as may be defined by a global positioning system (GPS) sensor, a global navigation satellite system (GNSS) sensor or other location sensor associated with the probe device and the time at which the vehicle is at the location, but also the speed, the heading, the bearing and other parameters that define the state of the vehicle that carries the probe device at the particular time. The probe data may also include an identifier, such as a trajectory identifier, that identifies the probe device that provides the probe data and enables the linking of different instances of probe data into trajectories while still maintaining the anonymity of the probe device and/or the vehicle that the probe device is onboard. Alternatively, the probe data may include a source identifier, such as in an instance in which the probe data was provided by a third party provider that aggregates probe data from various probe devices. In this regard, the source identifier may identify an original equipment manufacturer (OEM) of the probe device or vehicle.

The method, apparatus and computer program product of an example embodiment may be configured to generate a semantic privacy index for an entire trajectory. In other embodiments, however, the method, apparatus and computer program product are configured to generate a semantic privacy index for a portion of a trajectory, that is, a sub-trajectory. By generating a different semantic privacy index for each of a plurality of sub-trajectories of a trajectory with each sub-trajectory being associated with, for example, a different type of region, such as a different urban space, semantic privacy indices are provided at a more granular level. As used herein, reference to trajectory includes not only an entire trajectory, but also any sub-trajectory.

A trajectory and location data associated with a trajectory are associated with a person or vehicle that carries the probe device and may provide private information regarding the habits and behaviours of the user of the probe device that provides the probe points that comprise the trajectory. As described below, a determination as to whether a trajectory provides private information may be based on a variety of factors including, for example, the types of points of interest along the trajectory, such as proximate the final point of the trajectory, as some points of interest (hospitals, police stations, etc.) are considered more private than other points of interest (e.g., the home of the user of the probe device). Another factor as to whether the trajectory provides private information is the number of probe devices having the same or similar trajectory with the privacy concerns being inversely proportional to the number of other probe devices with the same or similar trajectories. In this regard, larger numbers of probe devices with the same or similar trajectories reduce the privacy concerns, while smaller numbers of probe devices with the same or similar trajectories (including, for example, sub-trajectories as noted above) have heightened privacy concerns.

With reference to FIG. 1, for example, a map illustrating a portion of a road network is depicted. Three trajectories have been map matched to links of the road network and are displayed upon the map. A first trajectory 10 is depicted in the lower left hand quadrant of the map of FIG. 1. The first trajectory 10 proceeds along links of the road network and terminates at or near a hospital 12. The first trajectory 10 therefore provides private information as the presence of the user of the probe device at the hospital may be confidential. The second trajectory 14 is depicted in the upper right quadrant of the map and again extends along several links of the road network. Unlike the first trajectory 10, however, the second trajectory 14 does not begin, end or otherwise pass by any points of interest that pose privacy concerns. Additionally, the second trajectory 14 is not unique in that many other probe devices have the same or similar trajectories, thereby further diminishing the privacy issues associated with the second trajectory. Further, a third trajectory 16 is depicted in the lower right quadrant of the map. Although the third trajectory 16 does not begin, end or pass by any points of interest that pose a privacy concern, the third trajectory 16 is relatively unique in that only two other vehicles have the same or similar trajectories, thereby heightening the privacy concerns associated with the third trajectory. Consequently, in this example, the first, second and third trajectories may have different degrees of privacy concerns with the first trajectory 10 posing the most significant privacy concerns, the third trajectory 16 posing an intermediate level of privacy concerns and the second trajectory 14 posing the least significant, if any, privacy concerns. Depending upon the amount of traffic carried by the portion of a road network, the number of same or similar trajectories that are considered to be small, intermediate and large may be predefined with the privacy concerns being inversely proportional to the number of same or similar trajectories.

In order to determine a semantic privacy index that may be then utilized in order to at least partially control the manner in which information regarding a trajectory is to be anonymized, an apparatus 20, such as of the type depicted in FIG. 2, is provided. The apparatus 20 is configured to determine a semantic privacy index as described below. The apparatus may be embodied by any of a wide variety of different computing devices including, for example, a server, a computer workstation, a personal computer, a desktop computer or any of a wide variety of mobile computing devices including a computing unit of a vehicle. Regardless of the type of computing device that embodies the apparatus, the apparatus of an example embodiment includes, is associated with or is in communication with processing circuitry 22, memory 24 and communication interface 26.

In some embodiments, the processing circuitry 22 (and/or co-processors or any other processors assisting or otherwise associated with the processing circuitry 22) may be in communication with the memory 24 via a bus for passing information among components of the apparatus. The memory 24 may be non-transitory and may include, for example, one or more volatile and/or non-volatile memories. In other words, for example, the memory may be an electronic storage device (for example, a computer-readable storage medium) comprising gates configured to store data (for example, bits) that may be retrievable by a machine (for example, a computing device like the processor). The memory may be configured to store information, data, content, applications, instructions, or the like for enabling the apparatus to carry out various functions in accordance with an example embodiment of the present invention. For example, the memory could be configured to buffer input data for processing by the processor. Additionally or alternatively, the memory could be configured to store instructions for execution by the processing circuitry.

The processing circuitry 22 may be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processor may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 22 may be configured to execute instructions stored in the memory 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (for example, physically embodied in circuitry) capable of performing operations according to an embodiment of the present invention while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of software instructions, the instructions may specifically configure the processing circuitry to perform the algorithms and/or operations described herein when the instructions are executed. However, in some cases, the processing circuitry may be a processor of a specific device (for example, a computing device) configured to employ an embodiment of the present invention by further configuration of the processor by instructions for performing the algorithms and/or operations described herein. The processing circuitry may include, among other things, a clock, an arithmetic logic unit (ALU) and logic gates configured to support operation of the processing circuitry.

The apparatus 20 of an example embodiment may also optionally include a communication interface 26 that may be any means such as a device or circuitry embodied in either hardware or a combination of hardware and software that is configured to receive and/or transmit data from/to other electronic devices in communication with the apparatus. Additionally or alternatively, the communication interface may be configured to communicate in accordance with various wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network.

Additionally or alternatively, the communication interface may include the circuitry for interacting with the antenna(s) to cause transmission of signals via the antenna(s) or to handle receipt of signals received via the antenna(s).

Referring now to FIG. 3, the operations performed, such as by the apparatus 20 of FIG. 2, in order to determine the semantic privacy index, are depicted. In this regard, the apparatus includes means, such as the processing circuitry 22, the communication interface 26 or the like, configured to receive information regarding a trajectory. See block 30. The apparatus may receive the information regarding the trajectory from a probe point database or from any of a wide variety of other sources of probe points. The information regarding the trajectory may define the plurality of probe points that comprise the trajectory. While various types of information regarding the plurality of probe points may be provided, the information regarding the plurality of probe points may include an identifier associated with the person or vehicle that carried the probe device during collection of the probe points, the location of the vehicle and the time at which the vehicle is at the location, as well as the speed, the heading, the bearing and other parameters that define the state of the vehicle that carries the probe device at the particular time. The probe data may also optionally include a trajectory identifier that identifies the probe device that provides the probe data and enables the linking of different instances of probe data into trajectories.

As shown in block 32 of FIG. 3, the apparatus 20 of this example embodiment also includes means, such as the processing circuitry 22 or the like, configured to map match the trajectory to one or more links of a road network. In this regard, the road network comprised of a plurality of links may be defined by map data stored by the memory 24 or a database accessible by the processing circuitry, such as via the communications interface 26. In this regard, the map data may define each of a plurality of links and provide information associated with the links, such as the function class of a link, whether a stop light or stop sign is associated with the link, the length of the link, and any intersection with which the link is associated.

In an example embodiment, the map data may include the information necessary to define a map of the roads and other features, at least in a certain region. In this regard, the map data may include various attributes of the road segments, such as represented by the links. The map data may also be representative of sidewalks or other types of pedestrian segments, as well as open areas, such as grassy regions or plazas.

The map data of an example embodiment may include node data, road segment data or link data, point of interest (POI) data or the like in addition to traffic data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map data may contain path segment and node data records or other data that may represent bicycle lanes, pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map data can include data about the POIs and their respective locations in the POI records. The map data may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

While the apparatus 20, such as the processing circuitry 22, of an example embodiment is configured to map match the trajectory to one or more links of the road network, the apparatus, such as the processing circuitry, the communication interface 26 or the like, of another embodiment is configured to provide information regarding the trajectory to external map matching circuitry. The external map matching circuitry of this example embodiment receives the information regarding the trajectory and returns information to the apparatus, such as the processing circuitry, the communication interface or the like, that identifies the one or more links of the road network to which the trajectory has been map matched by the external map matching circuitry.

Regardless of manner in which the trajectory has been map matched to a portion of the road network, the probe points that comprise the trajectory and, in turn, the trajectory itself are associated with the corresponding link(s) based upon the locations of the probe points so as to indicate that the probe points were captured during transit along the corresponding link(s). After having map matched the trajectory to one or more links of the road network, the apparatus 20 of an example embodiment includes means, such as the processing circuitry 22 or the like, configured to associate contextual information comprising one or more map features with the trajectory. See block 34 of FIG. 3. In this regard, the map features associated with the trajectory may be provided by the map database and are generally on or along the trajectory and, in some instances, are co-located with one or more of the probe points that comprise the trajectory. For example, the map features may be associated with one or more of the links of the road network to which the trajectory has been map matched. In some embodiments, the apparatus, such as the processing circuitry, is configured to associate map features with the trajectory in an instance in which the map features are within a predefined distance of the trajectory or the links of the road network to which the trajectory has been map matched. As such, not only are map features that are associated with the links to which the trajectory have been map matched correspondingly associated with the trajectory, but also other map features that are close to, e.g., within a predefined distance of, the trajectory or the links of the road network to which the trajectory has been map matched are associated with the trajectory.

The apparatus 20, such as the processing circuitry 22, is configured to associate a variety different types of map features with the trajectory including, for example, points of interest or at least certain types of points of interest and/or spatial regions that are inherently sensitive, such as a military base, a region with sparse human activity or other secure facility. Information regarding these and other types of map features may be provided by the map database. In addition, contextual information regarding the degree of uniqueness of the trajectory, such as the number of other similar trajectories, may also be associated with the trajectory.

As exemplified by the points of interest and the spatial regions that are inherently sensitive, the contextual information may have a spatial relationship to the trajectory, such as being on or along the trajectory or otherwise within a predefined distance of the trajectory or the link(s) of the road network to which the trajectory has been map matched. Another example of contextual information having a spatial relationship to the trajectory that may be associated with the trajectory includes geo-tagged text or image data, such as social media posts, geo-tagged photographs, street imagery from a camera mounted on a vehicle traversing at least a portion of the route defined by the trajectory or the like.

Regardless of the type of contextual information, such as a point of interest, a spatial region that is inherently sensitive, geo-tagged text or image data, etc., the contextual information that is associated with a trajectory may include various attributes of the point of interest, the spatial region that is inherently sensitive, the geo-tagged text or image data, etc. By way of example, in an instance in which points of interest are associated with a trajectory, the contextual information may include information regarding a category or type of the point of interest, such as an indication as to whether the point of interest is a hospital or other healthcare facility, a school, etc., information that provides various attributes of the POI, information regarding user-generated tags for the points of interest, etc.

In addition to or instead of contextual information having a spatial relationship to the trajectory, the contextual information that is associated with the trajectory may include information having a temporal relationship to the trajectory. In this regard, the temporal relationship may be defined such that the contextual information having the temporal relationship is associated with the same period of time during which the probe points that comprise a trajectory were captured, such as by being associated with the exact same period of time or, more generally, with the same time of day or day of week. Examples of information having a temporal relationship to the trajectory includes information regarding traffic density along the links to which the trajectory has been map matched. The information regarding traffic density may be provided for the exact same time period during which the probe points that comprise the trajectory were captured or may be historical traffic density information indicative of the traffic density along the links that comprise the trajectory during the same time of time or the same day of week.

Additionally or alternatively, the contextual information that is associated with the trajectory may include information that defines a relationship between two or more points of the trajectory. For example, the trajectory may terminate at a probe point coincident with a particular type of probe point, such as a hospital, or within a spatial region that is inherently sensitive, such as a military base. As such, one or more of the other probe points of the trajectory may also be defined to also be associated with the same type of probe point or the same type of spatial region even though these other probe points are located along the route leading to the hospital, but are spaced apart from and not coincident with the probe point or the spatial region that is inherently sensitive.

As described above, the contextual information that is associated with the trajectory may include various map features and other information that relates to the behaviour of others, in the aggregate, such as traffic density information. However, the contextual information associated with the trajectory may include information specific to the user of the probe device that collects the probe points that form the trajectory. This user-specific information may include demographic information including the age or age bracket of the user, the gender of the user, the profession of the user, etc. The user-specific information may optionally include explicit privacy preferences provided by the user, such as preferences that identify zones within the road network for which the location of the probe device of the user is not to be sensed and/or reported. Other types of information specific to the user may include information regarding routines of the user, such as frequently visited locations, historical paths taken by the user, driving habits, e.g., speed profile, stopping points or the like. In this regard, information specific to the user may include historical information regarding trajectories previously captured in conjunction with the user, historical information regarding the duration of prior trips taken by the user and/or historical information regarding the time of occurrence of previous trips taken by the user.

As shown in block 36 of FIG. 3, the apparatus 20 of an example embodiment also includes means, such as the processing circuitry 22, the communication interface 26 or the like, configured to provide information regarding the trajectory as well as contextual information associated with the trajectory including the one or more map features to a risk estimation model. The risk estimation model is configured to generate the semantic privacy index that quantifies the risk associated with re-identification of the trajectory following anonymization of the trajectory, such as in terms of the sensitivity associated with re-identification of the person or vehicle whose movements defined the trajectory. Although the risk estimation model may be defined in various manners, the risk estimation model of an example embodiment is a machine learning-based risk estimation model that implements a risk estimation algorithm, the execution of which generates the semantic privacy index to provide an objective measure of the risk associated with re-identification of the trajectory following anonymization of the trajectory.

The risk estimation model is trained in order to appropriately generate the semantic privacy index. The risk estimation model of this example embodiment may be trained based upon indications for the map features as to the risk associated with re-identification of the trajectory occasioned by the map features following anonymization of the trajectory, such as in terms of the sensitivity associated with re-identification of the person or vehicle whose movements defined the trajectory and the resulting correlation between the person or vehicle and the respective map feature. In this regard, for each different type of map feature, such as various points of interest, spatial regions that are inherently sensitive or otherwise have sensitive conditions or features or the like, an indication may be provided as to the risk associated with re-identification of the trajectory in terms of the sensitivity associated with re-identification of the person or vehicle whose movements defined the trajectory and the correlation between the person or vehicle and the type of map feature. The indications may be manually provided. Alternatively, the indications may be automatically learned, such as from historical data, such as data regarding traffic density, etc.

For example, an instance in which the re-identification of the person or vehicle whose movements defined the trajectory and the correlation of the person or vehicle to a particular map feature may be highly sensitive due to significant privacy concerns relating to the map feature. Therefore, an indication may be provided to the apparatus 20, such as the processing circuitry 22, and, in turn, to the risk estimation model that highlights the severity of the risk associated with re-identification of the trajectory and, in turn, the person or vehicle whose movements defined the trajectory as a result of likely correlation of the person or vehicle with the highly sensitive type of map feature. However, in other situations, the re-identification of the person or vehicle whose movements defined the trajectory and the correlation of the person or vehicle to a particular map feature may not be particularly sensitive due to few, if any, privacy concerns relating to the map feature. In this instance, the indication provided to the apparatus 20, such as the processing circuitry 22, and, in turn, to the risk estimation model may signal that the minimal nature of the risk associated with re-identification of the trajectory and, in turn, the person or vehicle whose movements defined the trajectory as a result of likely correlation of the person or vehicle with the minimally sensitive type of map feature. Similar indications may be provided for each different type of map feature, for each different type of spatial region that is inherently sensitive and for any other element for which contextual information is provided. As a result, the risk estimation model may be trained to recognize and react to the different degrees of risk associated with the re-identification of the trajectory depending upon the type of map features or other contextual information associated with the trajectory, such as in terms of the sensitivity associated with re-identification of the person or vehicle whose movements defined the trajectory and the resulting correlation between the person or vehicle and the respective map feature or other contextual information and to generate a corresponding semantic privacy index that quantifies the risk.

The training of the risk estimation model may also incorporate additional constraints, such as continuity in the spatial dimension, contextual dimension and temporal dimension. For example, the risk-estimation model may be trained by the apparatus 20, such the processing circuitry 22, such that map elements or other features that are spatially close or semantically equivalent will have the same or a similar impact upon the semantic privacy index. Additionally or alternatively, the risk-estimation model of an example embodiment may be trained such that map elements or other features that are associated with the same time or the same period of time will have the same or a similar impact upon the semantic privacy index. Further, the risk estimation model may be trained such that the risk of re-identifying a trajectory that has previously been anonymized is inversely proportional to the number of other trajectories that are the same or similar to the trajectory for which a semantic privacy index is being generated. The risk estimation model of an example embodiment may also be trained to take into account a user-specific privacy preference. For example, a physician or other health care professional may train the risk estimation model that a point of interest in the form of a hospital or other health care facility is not sensitive and should not increase the semantic privacy index in the same way that such a point of interest would affect the semantic privacy index for other people who are not health care professionals.

The semantic privacy index may be utilized for a variety of purposes. In an example embodiment, however, the apparatus 20 of an example embodiment also includes means, such as the processing circuitry 22 or the like, configured to cause the information regarding the trajectory to be anonymized in a manner dependent upon the semantic privacy index. See block 38 of FIG. 3. In this regard, in an instance in which the semantic privacy index indicates that the risk associated with re-identification of the trajectory following anonymization of the trajectory is significant, such as in terms of the substantial sensitivity associated with re-identification of the person or vehicle whose movements defined the trajectory and the correlation of the person or vehicle to the contextual information that has been associated with the trajectory, the apparatus, such as the processing circuitry, is configured to cause the information regarding the trajectory to be anonymized to a much greater degree, thereby rendering it much more difficult to re-identify the trajectory and, in turn, the person or vehicle whose movements defined the trajectory following anonymization of the trajectory and therefore more likely avoiding the risk associated with correlation of the contextual information associated with the trajectory with the person or vehicle. However, such greater degree of anonymization of the trajectory reduces the utility of location-based services that are based upon the anonymized trajectory.

In contrast, in an instance in which the semantic privacy index indicates that the risk of re-identifying the trajectory following anonymization of the trajectory is relatively small, such as in terms of the insubstantial sensitivity associated with re-identification of the person or vehicle whose movements defined the trajectory and the correlation of the person or vehicle to the contextual information that has been associated with the trajectory, the apparatus 20, such as the processing circuitry 22, is configured to cause the information regarding the trajectory to be anonymized to a lesser degree even though this more limited anonymization makes is less difficult to re-identify the trajectory and, in turn, the person or vehicle whose movements defined the trajectory following anonymization of the trajectory and correspondingly increases the risk that the contextual information associated with the trajectory with the person or vehicle will be correlated to the person or vehicle. This lesser degree of anonymization of the trajectory increases the utility of location-based services that are based upon the anonymized trajectory in comparison to more greatly anonymized trajectories. As also indicated in block 38, the information regarding the trajectory may not only be initially anonymized in a manner dependent upon the semantic privacy index, but information regarding the trajectory that has been previously anonymized may be processed so as to modify or adapt the anonymization based upon a semantic privacy index that has been newly generated or has changed since the initial anonymization.

As such, the method, apparatus 20 and computer program product of an example embodiment balance the risk of re-identifying the trajectory and, in turn, the person or vehicle whose movements defined the trajectory with the utility provided by information regarding the trajectory, such as in conjunction with the provision of location-based services. For example, in the instance in which the risk associated with re-identification the trajectory following anonymization of the trajectory is relatively low, the method, apparatus and computer program product of an example embodiment may be configured to subject the information regarding the trajectory to a limited form of anonymization such that the information regarding the trajectory retains substantial utility, such as for the provision of location-based services, following such limited anonymization. In contrast, in an instance in which the risk associated with re-identification of the trajectory following anonymization of the trajectory is significant, the method, apparatus and computer program product of an example embodiment are configured to impose a much greater degree of anonymization upon the trajectory, thereby increasing the likelihood that the trajectory and, in turn, the person or vehicle whose movements defined the trajectory will not be re-identified following the anonymization but further limiting the utility of the information regarding the trajectory, such as in conjunction with the provision of location-based services.

By balancing the risk associated with re-identification of the trajectory with the utility provided by information regarding the trajectory, such as in conjunction with the provision of location-based services, the method, apparatus 20 and computer program product of an example embodiment conserve processing resources in an instance in which the risk associated with re-identification of the trajectory following anonymization of the trajectory is lower or of less concern, such as in an instance in which the sensitivity of a correlation between the person or vehicle whose movements defined the trajectory and the contextual information associated with the trajectory is insubstantial, by not requiring that the trajectory be subjected to as substantial a degree of anonymization as in other instances in which the risk is greater. However, the method, apparatus and computer program product of an example embodiment are responsive to the privacy concerns by providing substantial anonymization of the trajectory in at least instances in which the risk associated with re-identification of the trajectory following the anonymization is correspondingly significant, such as in an instance in which the sensitivity of a correlation between the person or vehicle whose movements defined the trajectory and the contextual information associated with the trajectory is heightened.

The method, apparatus 20 and computer program product of an example embodiment may also be configured to evaluate the accuracy of the semantic privacy index based on crowd sourced input so as to validate the semantic privacy index. In this regard, a group of individuals may be provided information regarding two or more candidate spaces with each candidate space being a different geographical region. The information may not only identify the candidate spaces, but, in some embodiments, may provide contextual information, such as the time of day, etc. From among the two or more candidate spaces, the individuals are asked to provide an indication of the relative degree of privacy to be associated with the spaces, such as by indicating one space that is more private than the other space. In some embodiments, the responses by the individuals may be informed by other information regarding the candidate spaces, such as photographic scenes associated with the candidate spaces (which may include objects that create increased sensitivity concerns and/or which may indicate the number of people in the candidate space with the privacy concerns generally having an inverse relationship to the number of people), text snippets, such as tweets or reviews of points of interest within the candidate spaces (which may be subjected to a sentiment analysis to derive the privacy concerns associated with a candidate space), types of points of interest within the candidate spaces, the semantic privacy index for other spaces having similar points of interest or the like. The method, apparatus and computer program product are configured to compare the indications as to the relative privacy associated with a candidate space relative to the semantic privacy index that have been generated by the method, apparatus and computer program product for the candidate space. The results of this comparison not only provide a tool by which to evaluate the semantic privacy indices generated in accordance with an example embodiment, but may be utilized to further train the risk estimation model in order to provide enhanced performance in terms of the generation of more accurate semantic privacy indices in the future.

FIG. 3 illustrates a flowchart depicting a method according to an example embodiment of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 24 of an apparatus 20 employing an embodiment of the present invention and executed by the processing circuitry 22. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Furthermore, in some embodiments, additional optional operations may be included. Modifications, additions, or amplifications to the operations above may be performed in any order and in any combination.

Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for determining a semantic privacy index, the method comprising:
receiving information regarding a trajectory;
after the trajectory has been map matched to a portion of a road network, associating contextual information comprising one or more map features with the trajectory; and
providing the information regarding the trajectory and the contextual information comprising the one or more map features to a risk estimation model in order to generate the semantic privacy index that quantifies a risk associated with re-identification of the trajectory following anonymization of the trajectory.

2. A method according to claim 1 wherein the contextual information comprises information having a spatial relationship to the trajectory.

3. A method according to claim 2 wherein the information having the spatial relationship comprises information regarding one or more points of interest (POIs) located along the trajectory.

4. A method according to claim 2 wherein the information having the spatial relationship comprises geo-tagged text or image data.

5. A method according to claim 1 wherein the contextual information comprises information having a temporal relationship to the trajectory.

6. A method according to claim 1 wherein the contextual information defines a relationship between two or more points of the trajectory.

7. A method according to claim 1 wherein the contextual information associated with the trajectory comprises information specific to a user of a probe device that collects a plurality of probe points that form the trajectory.

8. A method according to claim 1 further comprising causing the information regarding the trajectory to be anonymized in a manner dependent upon the semantic privacy index.

9. A method according to claim 1 further comprising training the risk estimation model based upon indications for the map features as to the risk associated with re-identification of the trajectory occasioned by the map features following anonymization of the trajectory.

10. An apparatus configured to determine a semantic privacy index, the apparatus comprising at least one processor and at least one non-transitory memory including computer program code instructions, the computer program code instructions configured to, when executed by the at least one processor, cause the apparatus to:

receive information regarding a trajectory;

after the trajectory has been map matched to a portion of a road network, associate contextual information comprising one or more map features with the trajectory; and provide the information regarding the trajectory and the contextual information comprising the one or more map features to a risk estimation model in order to generate the semantic privacy index that quantifies a risk associated with re-identification of the trajectory following anonymization of the trajectory.

11. An apparatus according to claim 10 wherein the contextual information comprises information having a spatial relationship to the trajectory.

12. An apparatus according to claim 10 wherein the contextual information comprises information having a temporal relationship to the trajectory.

13. An apparatus according to claim 10 wherein the contextual information defines a relationship between two or more points of the trajectory.

14. An apparatus according to claim 10 wherein the contextual information associated with the trajectory comprises information specific to a user of a probe device that collects a plurality of probe points that form the trajectory.

15. An apparatus according to claim 10 wherein the computer program code instructions are further configured to, when executed by the at least one processor, cause the apparatus to cause the information regarding the trajectory to be anonymized in a manner dependent upon the semantic privacy index.

16. An apparatus according to claim 10 wherein the computer program code instructions are further configured to, when executed by the at least one processor, cause the apparatus to train the risk estimation model based upon indications for the map features as to the risk associated with re-identification of the trajectory occasioned by the map features following anonymization of the trajectory.

17. A computer program product configured to determine a semantic privacy index, the computer program product comprising at least one non-transitory computer-readable storage medium having computer-executable program code instructions stored therein, wherein the computer-executable program code instructions are configured to:

receive information regarding a trajectory;

after the trajectory has been map matched to a portion of a road network, associate contextual information comprising one or more map features with the trajectory; and provide the information regarding the trajectory and the contextual information comprising the one or more map features to a risk estimation model in order to generate the semantic privacy index that quantifies a risk associated with re-identification of the trajectory following anonymization of the trajectory.

18. A computer program product according to claim 17 wherein the contextual information associated with the trajectory comprises information specific to a user of a probe device that collects a plurality of probe points that form the trajectory.

19. A computer program product according to claim 17 wherein the computer-executable program code instructions are further configured to cause the information regarding the trajectory to be anonymized in a manner dependent upon the semantic privacy index.

20. A computer program product according to claim 17 wherein the computer-executable program code instructions are further configured to train the risk estimation model based upon indications for the map features as to the risk associated with re-identification of the trajectory occasioned by the map features following anonymization of the trajectory.

* * * * *